(12) United States Patent
Sarasmo

(10) Patent No.: US 12,126,189 B2
(45) Date of Patent: Oct. 22, 2024

(54) DATA TRANSMISSION BETWEEN POWER SOURCE AND WIRELESS APPARATUS

(71) Applicant: HALTIAN OY, Oulu (FI)

(72) Inventor: Marko Sarasmo, Oulu (FI)

(73) Assignee: HALTIAN OY, Oulu (FI)

(*) Notice: Subject to any disclaimer, the term of this patent is extended or adjusted under 35 U.S.C. 154(b) by 60 days.

(21) Appl. No.: 18/023,571

(22) PCT Filed: Aug. 26, 2021

(86) PCT No.: PCT/EP2021/073617
§ 371 (c)(1),
(2) Date: Feb. 27, 2023

(87) PCT Pub. No.: WO2022/043439
PCT Pub. Date: Mar. 3, 2022

(65) Prior Publication Data
US 2023/0327496 A1 Oct. 12, 2023

(30) Foreign Application Priority Data
Aug. 28, 2020 (EP) ..................... 20193396

(51) Int. Cl.
*H02J 50/80* (2016.01)
*H04L 1/00* (2006.01)
*H04L 5/00* (2006.01)

(52) U.S. Cl.
CPC ............. *H02J 50/80* (2016.02); *H04L 1/001* (2013.01); *H04L 5/0044* (2013.01)

(58) Field of Classification Search
CPC ...................................... H02J 50/80
(Continued)

(56) References Cited

U.S. PATENT DOCUMENTS 5,633,573 A 5/1997 Van Phuoc et al.
9,680,471 B2 6/2017 Stirk
(Continued)

FOREIGN PATENT DOCUMENTS

EP 2 919 124 9/2015

OTHER PUBLICATIONS

Extended EP Search Report for EP20193396.7 dated Feb. 25, 2021, 6 pages.
(Continued)

*Primary Examiner* — Joseph Chang
(74) *Attorney, Agent, or Firm* — Nixon & Vanderhye PC

(57) ABSTRACT

Method for transmitting payload data in an electric power supply connector between a power source and a wireless apparatus is disclosed. Method includes: obtaining, by the power source, payload data to be transmitted; encoding, by the power source, the payload data using a predefined voltage modulation method; altering, by the power source, a voltage level of the electric connector in order to trigger the wireless apparatus to sample the electric connector; modulating, by the power source, the voltage level of the electric connector in order to transmit the encoded payload data to the wireless apparatus; and after detecting, by the wireless apparatus, that the voltage level of the electric connector is altered, starting, by the wireless apparatus, to sample the voltage of the electric connector in order to receive the encoded payload data, and decode the encoded payload data.

15 Claims, 3 Drawing Sheets

Figure 1:
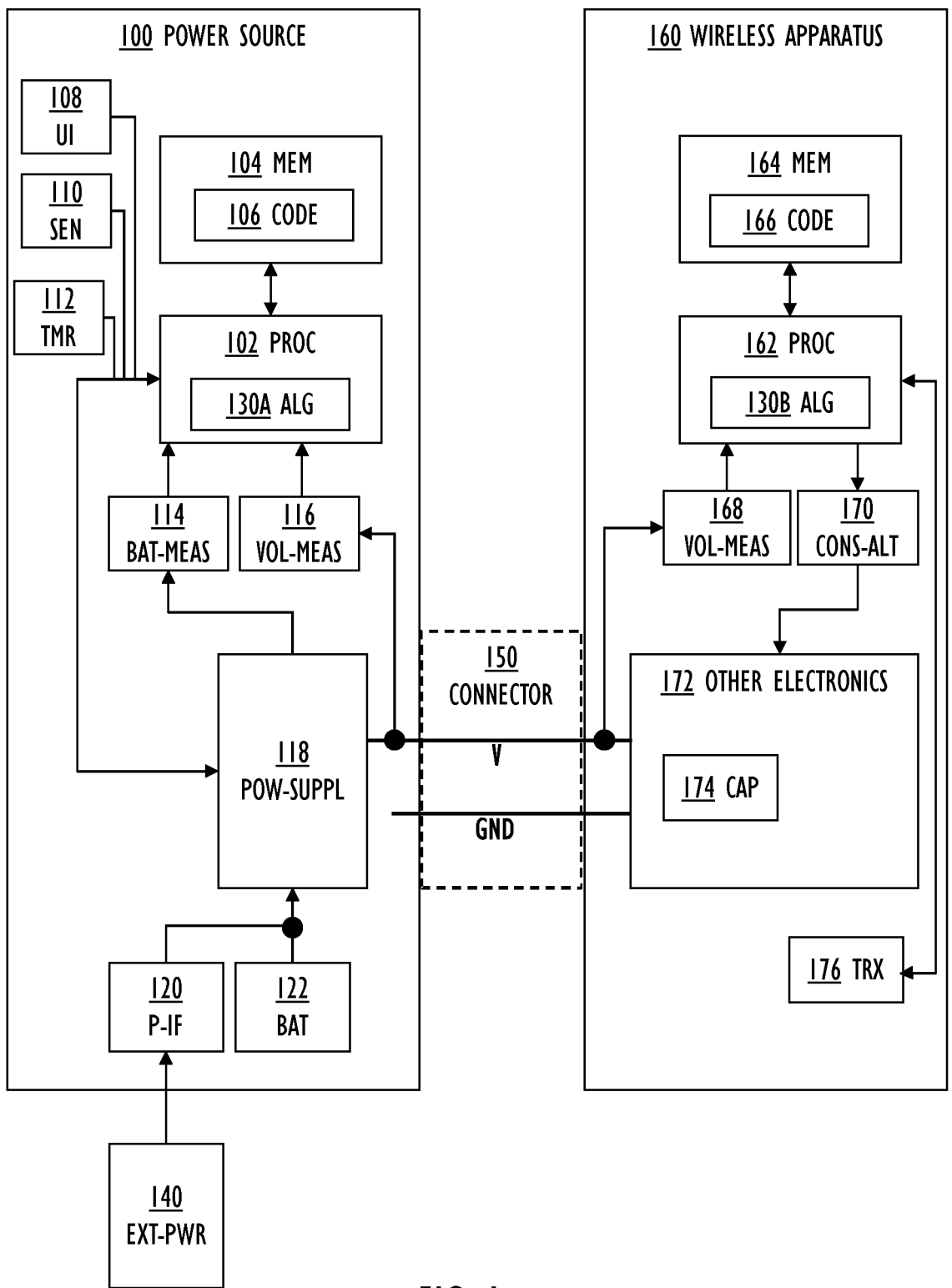

(58) Field of Classification Search
USPC .......................................................... 307/104
See application file for complete search history.

(56) References Cited

U.S. PATENT DOCUMENTS

| | | |
|---|---|---|
| 10,481,211 B2 | 11/2019 | Thiel |
| 2010/0093401 A1 | 4/2010 | Moran et al. |
| 2015/0327168 A1 | 11/2015 | Yllasjarvi et al. |
| 2019/0056132 A1 | 2/2019 | Warren et al. |
| 2022/0414055 A1* | 12/2022 | Collier .................. G06F 16/116 |

OTHER PUBLICATIONS

International Search Report for PCT/EP2021/073617 mailed Dec. 23, 2021, 4 pages.
Written Opinion of the ISA for PCT/EP2021/073617 mailed Dec. 23, 2021, 6 pages.

\* cited by examiner

DATA TRANSMISSION BETWEEN POWER SOURCE AND WIRELESS APPARATUS

This application is the U.S. national phase of International Application No. PCT/EP2021/073617 filed Aug. 26, 2021 which designated the U.S. and claims priority to EP 20193396.7 filed Aug. 28, 2020, the entire contents of each of which are hereby incorporated by reference.

FIELD

Various embodiments relate to a data transmission between a power source and a wireless apparatus. More specifically, the embodiments relate to a system comprising a power source, a wireless apparatus, and an electric connector configured to supply electric power from the power source to the wireless apparatus, and to a method for transmitting payload data in the electric power supply connector between the power source and the wireless apparatus.

BACKGROUND

Electric power consumption of wireless apparatuses is a problem, and an external power source may be used to provide additional power. In some cases, monitoring of the charging level of the external power source is difficult.

U.S. Pat. Nos. 5,633,573, 9,680,471 B2 and 10,481,211 B2 disclose various solutions, but they seem to operate within a power source, and not between the power source and the wireless apparatus. US 2019/0056132 A1 discloses smart-home device telemetry circuits for detecting electrical anomalies in a population of devices. US 2010/0093401 A1 discloses modular wireless communicator. US 2015/0327168 A1 discloses adjustment of sensor measurement and transmission intervals in mobile apparatus.

BRIEF DESCRIPTION

According to an aspect, there is provided a system comprising a power source, a wireless apparatus, and an electric connector configured to supply electric power from the power source to the wireless apparatus, wherein the power source comprises: a power supply configured to be powered by one or more batteries; one or more memories including computer program code; and a processor configured to execute the computer program code to cause the power source to perform the following: obtaining payload data to be transmitted; encoding the payload data using a predefined voltage modulation protocol; controlling the power supply to alter a voltage level of the electric connector in order to trigger the wireless apparatus to sample the voltage of the electric connector; and controlling the power supply to modulate the voltage level of the electric connector in order to transmit the encoded payload data to the wireless apparatus; and wherein the wireless apparatus comprises: one or more memories including computer program code; and a processor to execute the computer program code to cause the wireless apparatus to perform the following: after detecting that the voltage level of the electric connector is altered, starting to sample the voltage of the electric connector in order to receive the encoded payload data, and decode the encoded payload data. Dependent claims define some embodiments.

In an embodiment, the electric connector is configured to use two lines: a ground line and a voltage line.

In an embodiment, the power supply is configured to operate using two or more voltage levels, and the predefined voltage modulation protocol is configured to encode the payload data using the two or more voltage levels.

In an embodiment, the power source comprises: a battery level measurement circuit configured to measure a charging level of the one or more batteries; and the power source is caused to perform obtaining the charging level from the battery level measurement circuit as the payload data to be transmitted.

According to an aspect, there is provided a method for transmitting payload data in an electric power supply connector between a power source and a wireless apparatus, the method comprising: obtaining, by the power source, payload data to be transmitted; encoding, by the power source, the payload data using a predefined voltage modulation method; altering, by the power source, a voltage level of the electric connector in order to trigger the wireless apparatus to sample the voltage of the electric connector; modulating, by the power source, the voltage level of the electric connector in order to transmit the encoded payload data to the wireless apparatus; and after detecting, by the wireless apparatus, that the voltage level of the electric connector is altered, starting, by the wireless apparatus, to sample the voltage of the electric connector in order to receive the encoded payload data, and decode the encoded payload data.

One or more examples of implementations are set forth in more detail in the accompanying drawings and the description of embodiments.

LIST OF DRAWINGS

Figure 2:
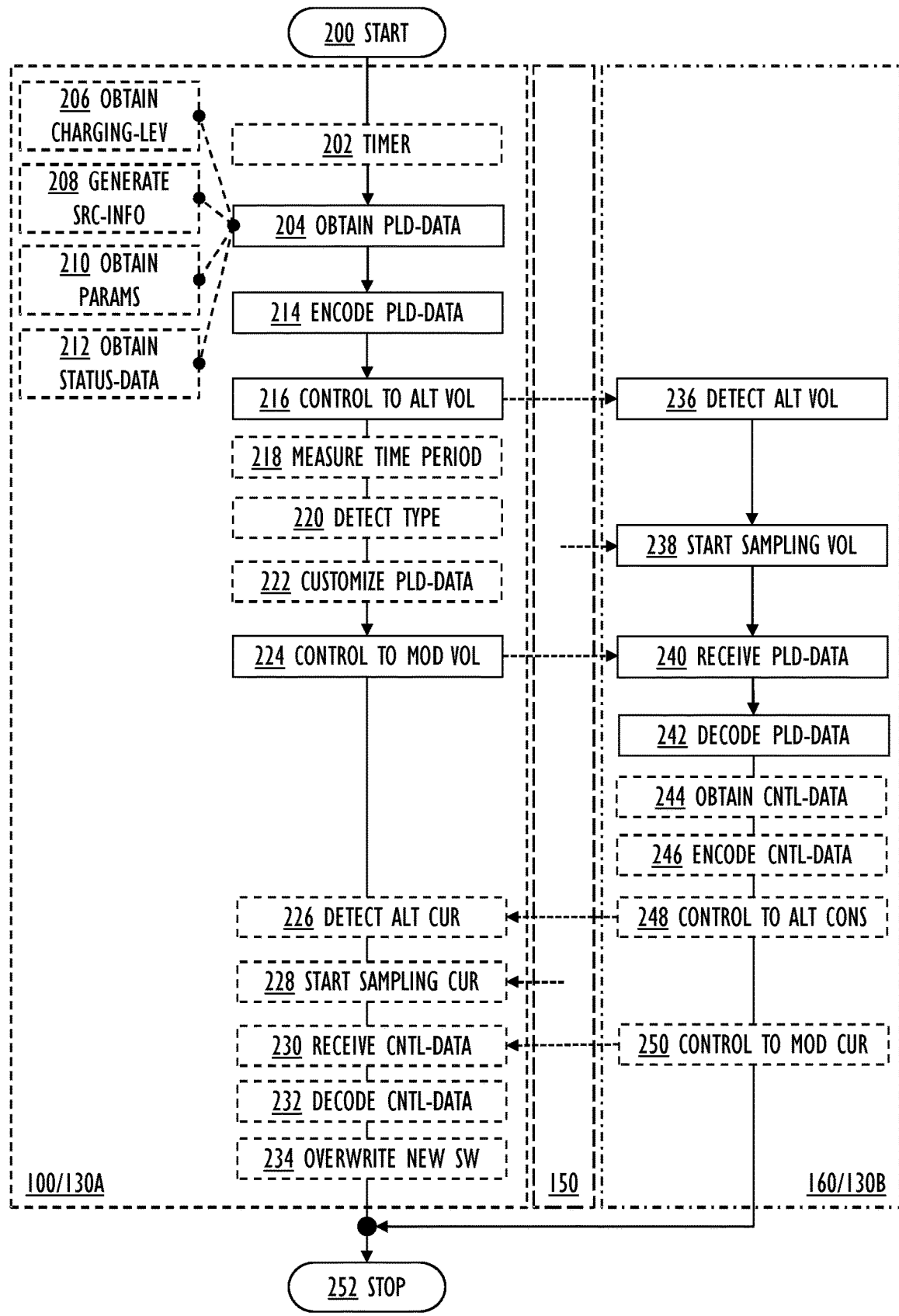
Figure 3:
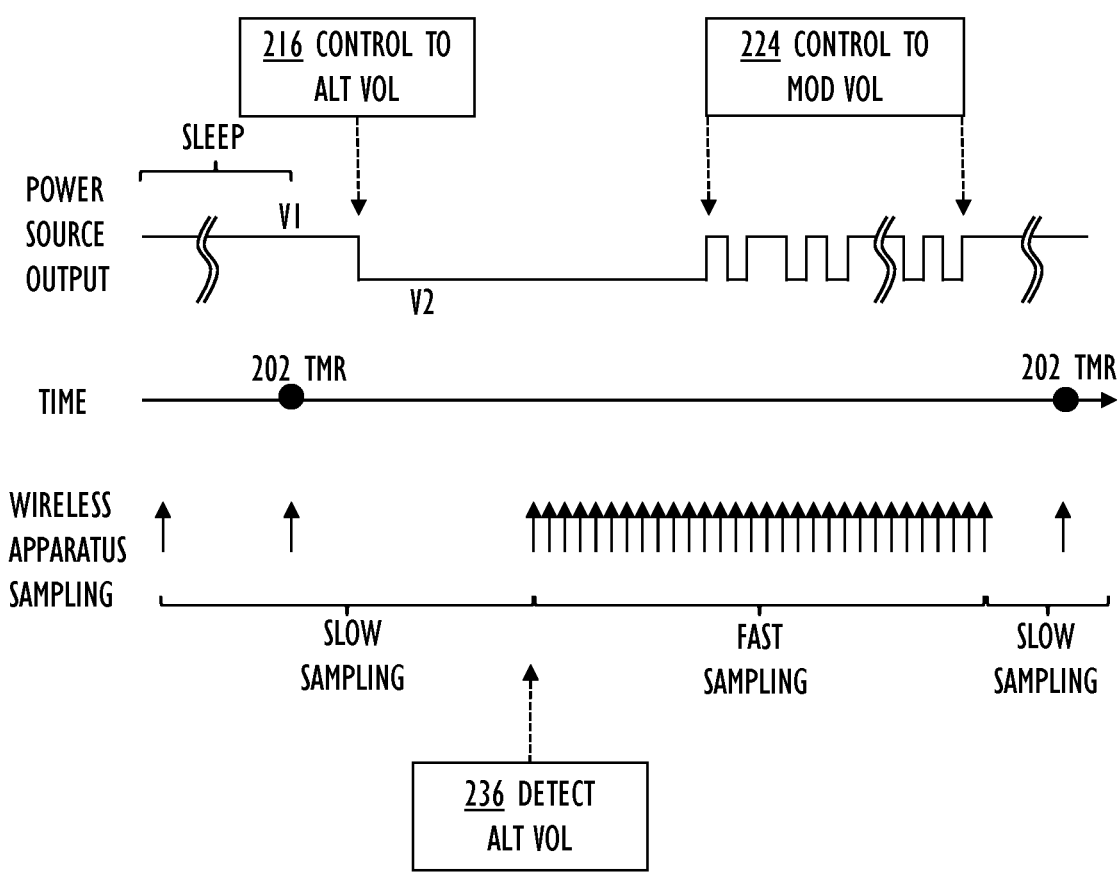

Some embodiments will now be described with reference to the accompanying drawings, in which FIG. 1 illustrates embodiments of a system comprising a power source, a wireless apparatus, and an electric connector;

FIG. 2 is a flow chart illustrating embodiments of a method for transmitting payload data in the electric power supply connector between the power source and the wireless apparatus; and FIG. 3 illustrated embodiments of a data transmission in the electric power supply connector.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Let us study FIG. 1, which illustrates embodiments of a system comprising a power source 100, a wireless apparatus 160, and an electric connector 150 configured to supply electric power from the power source 100 to the wireless apparatus 160, and FIG. 2, which illustrates embodiments of a method for transmitting payload data in the electric power supply connector 150 between the power source 100 and the wireless apparatus 160. The method may be implemented as an algorithm 130A, 130B, whose functionality is distributed between the power source 100 and the wireless apparatus 160, and programmed as computer program code 106, 166, which is executed by each actor 100, 160 as a special purpose computer.

The power source 100 comprises a power supply 118 configured to be powered by one or more batteries 122.

In an embodiment, the power supply 118 may be a switched-mode power supply (SMPS) configured to transfer the electric power from a DC source (such as the one more batteries 122) or from an AC source (such as mains power 140) to DC loads, while possibly converting voltage and current. The ratio of on-to-off time (also known as duty cycles) is varied to implement the voltage regulation. However, also another type of power supply 118 may be used, such as a low-dropout (LDO) regulator, which is a type of DC linear voltage regulator, and configured to regulate the output voltage even when the supply voltage is very close to the output voltage.

In an embodiment, the power supply 118 is connected to one or more long-life batteries 122. The one or more batteries 122 may be rechargeable. Alternatively, or additionally, the power supply 118 may be coupled permanently or as required (by service personnel, for example) to an external power 140, such as mains electricity or an accumulator. The power supply 118 may receive the electric power via a power interface 120. The one or more batteries 122 may be recharged via the power interface 120. The power interface 120 may operate according to the USB (Universal Serial Bus) standard, but also other suitable standard or proprietary power interfaces may be used.

In a typical use case, the wireless apparatus 160 is a wireless sensor apparatus such as a plug-and play IoT (Internet of Things) apparatus from a Thingsee® product line of Haitian, and the power source 100 is an additional or sole power source for the wireless apparatus 160. However, the wireless apparatus 160 may also be another type of apparatus operating wirelessly and requiring the power source 100, such as a radio node communicating with a wireless network (such as a mesh network, a wireless local area network, or a cellular radio network), or any other type of a wireless apparatus 160. The wireless apparatus 160 and the power source 100 may be independent apparatuses, each in its own protective cover, but they may be mechanically couplable with each other. The batteries 122 may be inside the protective cover of the power source 100, but in some use cases they may be separate as well.

The wireless apparatus 160 comprises a radio transceiver 176. The radio transceiver 176 may operate using a standard or proprietary wireless communication protocol. The radio transceiver 176 may utilize a cellular radio network (GSM, GPRS, EGPRS, WCDMA, UMTS, 3GPP, IMT, LTE, LTE-A, 3G, 4G, 5G etc.), a wireless local area network (such as WLAN, Wi-Fi, etc.), a short-range radio network (such as Bluetooth or Bluetooth Low Energy BLE, etc.), or a wireless mesh network, for example. The use of the cellular radio network may necessitate use of a subscriber identity module (SIM), either as a physical chip, or as an embedded-SIM (eSIM), for example.

The power source 100 also comprises one or more memories 104 including computer program code 106, and a processor 102 configured to execute the computer program code 106 to cause the power source 100 to perform one part 130A of the algorithm.

The wireless apparatus 160 comprises one or more memories 164 including computer program code 166, and a processor 162 to execute the computer program code 166 to cause the wireless apparatus 160 to perform another part 130B of the algorithm.

The term 'processor' 102, 162 refers to a device that is capable of processing data. When designing the implementation of the processor 102, 162 a person skilled in the art will consider the requirements set for the size and power consumption, the necessary processing capacity, production costs, and production volumes, for example.

The term 'memory' 104, 164 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

A non-exhaustive list of implementation techniques for the processor 102, 162 and the memory 104, 164 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 106, 166 may be implemented by software. In an embodiment, the software may be written by a suitable programming language, and the resulting executable code may be stored in the memory 104, 164 and executed by the processor 102, 162.

The computer program code 106, 166 implements the distributed algorithm 130A, 130B. The computer program code 106, 166 may be coded as a computer program (or software) using a programming language, which may be a high-level programming language, such as C, C++, or Java, or a low-level programming language, such as a machine language, or an assembler, for example. The computer program code 106, 166 may be in source code form, object code form, executable file, or in some intermediate form. There are many ways to structure the computer program code 106, 166: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 106, 166 for performing a wide variety of standard operations. In addition, an operating system (such as a general-purpose operating system) may provide the computer program code 106, 166 with system services.

In an embodiment, the processor 102, 162 may be implemented as a microprocessor implementing functions of a central processing unit (CPU) on an integrated circuit. The CPU is a logic machine executing the computer program code 106, 166. The CPU may comprise a set of registers, an arithmetic logic unit (ALU), and a control unit (CU). The control unit is controlled by a sequence of the computer program code 106, 166 transferred to the CPU from the (working) memory 104, 164. The control unit may contain a number of microinstructions for basic operations. The implementation of the microinstructions may vary, depending on the CPU design.

In an embodiment, the processor 102, 162 and the one or more memories 104, 164 are implemented as a microcontroller, possibly with a full suite of program and system development tools, maybe even with software libraries and a real-time operating system.

As mentioned earlier, the electric connector 150 is configured to supply electric power from the power source 100 to the wireless apparatus 160. The electric power is supplied by the power supply 118 and originates from the one or more batteries 122 or via the power interface 120 from the external power 140. In an embodiment, the electric connector 150 comprises mechanical snap-fit connectors configured to mechanically interlock the power source 100 and the wireless apparatus 160 with each other, and pogo pins (also known as spring-loaded pins) with the counterpart connect points such as pads (of a printed circuit board) configured to electrically couple the power source 100 and the wireless apparatus 160 with each other. Besides pogo pins and counterpart connect points other types of connectors may be used such as C-clips, board-to-board connectors, wire connections, or wire-to-board connections, or any other type of hardware capable of transferring electric power from the power source 100 to the wireless apparatus 160. In an embodiment, the electric connector 150 is configured to use (only) two lines: a ground line GND and a (DC) voltage line V, whereby no special signalling lines are needed. This simplifies the implementation, makes the electric connector 150 more robust and smaller in size. If the pogo pins are used, the two lines may be implemented with two pogo pins and their two counterpart connect points. There is no need for a separate data communication interface like any known serial interface such as SPI (Serial Peripheral Interface) or I²C (Inter-Integrated Circuit) or any other single wire interface.

Now that the basic structures of the power source 100, the connector 150 and the wireless apparatus 160 have been explained, let us study their functionality, i.e., the method/algorithm with reference to FIG. 2. Let us simultaneously also study FIG. 3 illustrating data transmission in the electric power supply connector 150.

The method starts in 200 and ends in 252. Note that the method may run as long as required (after the start-up of the power source 100 and the wireless apparatus 160 until switching off) by looping back to an operation 202 or 204.

The operations are not strictly in chronological order in FIG. 2, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

In 204, payload data to be transmitted is obtained by the power source 100.

In 214, the payload data is encoded by the power source 100 using a predefined voltage modulation method.

In 216, the power supply 118 of the power source 100 is controlled to alter a voltage level of the electric connector 150 in order to trigger the wireless apparatus 160 to sample the electric connector 150. This is shown in FIG. 2 as the change from the voltage level V1 to the voltage level V2. Although the change is from the higher voltage level V1 to the lower voltage level V2, the change may also be the other way around: from a lower voltage level to a higher voltage level.

In an embodiment, the power supply 118 of the power source 100 is configured to operate using two or more voltage levels, and the predefined voltage modulation protocol is configured to encode 214 the payload data using the two or more voltage levels. As shown in FIG. 3, the example utilizes to voltage levels V1 and V2 (which may be 3.3 V and 2.7 V, for example), whereby the voltage modulation protocol may encode the data to be transmitted using a binary notation with two levels. A binary code may then assign a pattern of binary digits (also known as bits) to each character of the data to be transmitted. A binary string of eight bits then represents $2^8=256$ different values. However, if more than two voltage levels are used, then the resulting code may be more complex: with four voltage levels a quaternary code (using a base-4 numeral system) may be used. The number of voltage levels for the voltage modulation protocol may be selected to suit a specific use case and circumstances.

In 224, the power supply 118 of the power source 100 is controlled to modulate the voltage level of the electric connector 150 in order to transmit the encoded payload data to the wireless apparatus 160.

This sequence 204-214-216-224 is performed by the power source 100 as the part 130A of the algorithm.

In parallel with the execution of the part 130A of the algorithm by the power source 100, the wireless apparatus 160 performs the part 130B of the algorithm.

After detecting in 236, by the wireless apparatus 160, that the voltage level of the electric connector 150 is altered, the wireless apparatus starts in 238 to sample the voltage of the electric connector 150 in order to receive the encoded payload data in 240, and decode the encoded payload data in 242. For operations 236 and 238, the wireless apparatus 160 may comprise a voltage measurement circuit 168 configured to measure the voltage continuously.

With the described processing, the electric power supply connector 150 acts as a wired transmission medium from the power source 100 acting as a transmitter to the wireless apparatus 160 acting as a receiver 160. Besides transferring the electric power, the electric connector 150 also conveys encoded data transmission.

Next, let us study various optional embodiments, which by their nature are combinable with each other in any combination, except if otherwise noted.

The first four embodiments relate to the nature of the payload data to be transmitted.

In an embodiment, the power source 100 comprises a battery level measurement circuit 114 configured to measure a charging level of the one or more batteries 122. The power source 100 is caused to perform the following: in 206, obtaining the charging level from the battery level measurement circuit 114 as the payload data to be transmitted.

In an embodiment, the power source 100 comprises a power interface 120 configured to receive electric power from an external source 140. The power source 100 is caused to perform the following: in 208, generating source information indicating whether the electric power is obtained from the one or more batteries 122 or from the external source 140 as the payload data to be transmitted.

In an embodiment, the power source 100 comprises one or more sensors 110 configured to measure one or more parameters. The power source 100 is caused to perform the following: in 210, obtaining the one or more parameters from the one or more sensors 110 as the payload data to be transmitted. The one or more sensors 110 comprise, but are not limited to: a temperature sensor, an accelerometer, a leakage detection sensor, an air quality sensor, a CO2 level sensor, a humidity sensor, a barometric pressure sensor, an angle sensor, an orientation sensor, an ambient light sensor, an accelerometer, a location sensor (such as a GPS receiver), or any other type of sensor detecting events or changes in its environment.

In an embodiment, the power source 100 comprises one or more user interface elements 108 configured to present status data related to the power source 100. The power source 100 is caused to perform the following: in 212, obtaining the status data from the one or more user interface elements 108 as the payload data to be transmitted. The one or more user interface elements 108 comprise, but are not limited to: a display, one or more leds, or any other means of conveying information to a human being observing the power source 100.

In an embodiment, the power source 100 is caused to perform the following:

1) After controlling the power supply 118 to alter the voltage level of the electric connector 150 in 216, measuring in 218 a time period it takes from the voltage level to change from an original level to an altered level. Even though this change from V1 to V2 in FIG. 3 is depicted as being instantaneous, it will take a certain time period.

2) In 220, detecting a type of the wireless apparatus 160 based on comparing the time period to a set of stored time periods, each time period indicating a specific type of the wireless apparatus 160. The time period is affected by a specific capacitance caused by one or more capacitors 174 of the wireless apparatus 160 into the electric connector 150.

3) In 222, customizing the payload data to be transmitted based on the detected type of the wireless apparatus 160.

With this embodiment, the power source 100 is of the plug-and-play type as the power source 100 automatically recognizes the type of the wireless apparatus 160 connected to it by measuring the voltage level behaviour as described.

In an embodiment, the power source 100 comprises a timer 112 configured to wake up 202 the processor 102 continuously after a predetermined time period has passed in order to perform the described processing 204, 214, 216, 224. FIG. 3 illustrates this, the processor 102 of the power source 100 is in a sleep-state, and it is triggered to wake up 202 periodically by the timer 112. The sleep period may be two hours, for example. In this way, the electric power is saved.

In an embodiment, the processor 162 of the wireless apparatus 160 is configured to perform slow sampling as a default. If the voltage change is detected 236, then a fast sampling is initiated and continued for the duration of the data reception, and after that the slow sampling is continued. The frequency of the slow sampling may be once in every five seconds, for example. In this way, the electric power is saved. As an additional or even an alternative way to trigger the wireless apparatus 160 to sample the electric connector 150 is a timer (not illustrated): the timer may operate such that it wakes the wireless apparatus 160 to start the slow sampling for example one minute before the expected timer transmission, and at other times the wireless apparatus 160 is in a sleep state. The clocks of the power source 100 and the wireless apparatus 160 may be synchronized, or alternatively the wireless apparatus 160 keeps track of time between the transmissions from the power source 100 and wakes up for reception as needed. The power source 100 may also signal information about periodicity of its transmissions. If the power source 100 is configured to transmit data every two hours, the wireless apparatus 160 is configured to wake up and start the slow sampling one minute before the ongoing two-hour period has passed. After detecting the voltage change, the fast sampling is started.

So far, the data transmission has been unidirectional from the power source 100 to the wireless apparatus 160. However, in an embodiment, the data transmission may be bidirectional, i.e., data may also be transmitted from the wireless apparatus 160 to the power source 100. For the transmission, the wireless apparatus 160 is caused to perform the following:

1) In 244, obtaining control data to be transmitted.

2) In 246, encoding the control data using a predefined current modulation protocol.

3) In 248, controlling the wireless apparatus 160 to alter a consumption of the electric power obtained from the electric connector 150. For this, the wireless apparatus 160 may comprise a power consumption alteration circuit 170 coupled with other electronics 172 comprising the one or more capacitors 174, and configured to alter the consumed level of the current.

4) In 250, controlling the wireless apparatus 160 to modulate the current level of the electric connector 150 in order to transmit the encoded control data to the power source 100.

For the reception, the power source 100 is caused to perform the following:

1) After detecting that the current level of the electric connector 150 is altered in 226, starting in 228 to sample the current of the electric connector 150 in order to receive the encoded control data in 230, and decode the encoded control data in 232. The power source 100 may comprise a resistor (not illustrated) coupled to the power connector 150, and a voltage measurement circuit 116 configured to measure a voltage change over the resistor caused by the altered current.

In an embodiment, the wireless apparatus 160 is configured to operate using two or more current levels, and the predefined current modulation protocol is configured to encode 246 the control data using the two or more current levels. The predefined current modulation protocol is similar to the earlier described predefined voltage modulation protocol, except that the current is modulated instead of the voltage, and naturally the transmission direction is also opposite. With this embodiment, two-way transmission may be realized using the simple electric power supply connector 150. Note that one or both protocols may employ synchronization, data parity check, encryption and other functionalities to further increase the robustness of the data transfer. In addition to this, or alternatively, the communication speed and/or voltage level/current level may be fixed or variable depending on the types of the power source 100 and the wireless apparatus 160 in order to be adaptive to eliminate or mitigate an external noise or other interference. Implementation of each protocol may be proprietary.

In an embodiment, the control data comprises control information related to the predefined voltage modulation protocol. The control information may comprise an acknowledgement (ACK) or a negative-acknowledgement (NACK). This increases the robustness of the data transmission from the power source 100 to the wireless apparatus 160. If desired, a simple ARQ (automatic repeat request) protocol may be implemented with ACK and NACK functionality.

In an embodiment, the control data comprises new software for the power source 100. The power source 100 is caused to perform the following: overwriting 234 the new software into the one or memories 104 of the power source 100. The overwriting 234 of the new software may be done to update the software. The overwriting 234 may be performed by an operation called "flashing". The new software may be received with the wireless transceiver 176 by the wireless apparatus 160 and then loaded into the power source 100 with this embodiment. This is practical as then the power source 100 need not have any wireless transceiver.

Even though the invention has been described with reference to one or more embodiments according to the accompanying drawings, it is clear that the invention is not restricted thereto but can be modified in several ways within the scope of the appended claims.

The invention claimed is:

1. A system comprising a power source, a wireless apparatus, and an electric connector configured to supply electric power from the power source to the wireless apparatus,
wherein the power source comprises:
a power supply configured to be powered by one or more batteries;
one or more memories including computer program code; and
a processor configured to execute the computer program code to cause the power source to perform the following:
obtaining payload data to be transmitted;
encoding the payload data using a predefined voltage modulation protocol;
controlling the power supply to alter a voltage level of the electric connector in order to trigger the wireless apparatus to sample the voltage of the electric connector; and
controlling the power supply to modulate the voltage level of the electric connector in order to transmit the encoded payload data to the wireless apparatus;
and wherein the wireless apparatus comprises:
one or more memories including computer program code; and
a processor to execute the computer program code to cause the wireless apparatus to perform the following:
after detecting that the voltage level of the electric connector is altered, starting to sample the voltage of the electric connector in order to receive the encoded payload data, and decode the encoded payload data.

2. The system of claim 1, wherein the electric connector is configured to use two lines: a ground line and a voltage line.

3. The system of claim 1, wherein the power supply is configured to operate using two or more voltage levels, and the predefined voltage modulation protocol is configured to encode the payload data using the two or more voltage levels.

4. The system of claim 1,
wherein the power source comprises:
a battery level measurement circuit configured to measure a charging level of the one or more batteries;
and wherein the power source is caused to perform the following:
obtaining the charging level from the battery level measurement circuit as the payload data to be transmitted.

5. The system of claim 1,
wherein the power source comprises:
a power interface configured to receive electric power from an external source;
and wherein the power source is caused to perform the following:
generating source information indicating whether the electric power is obtained from the one or more batteries or from the external source as the payload data to be transmitted.

6. The system of claim 1,
wherein the power source comprises:
one or more sensors configured to measure one or more parameters;
and wherein the power source is caused to perform the following:
obtaining the one or more parameters from the one or more sensors as the payload data to be transmitted.

7. The system of claim 1,
wherein the power source comprises:
one or more user interface elements configured to present status data related to the power source;
and wherein the power source is caused to perform the following:
obtaining the status data from the one or more user interface elements as the payload data to be transmitted.

8. The system of claim 1,
wherein the power source is caused to perform the following:
after controlling the power supply to alter the voltage level of the electric connector, measuring a time period it takes from the voltage level to change from an original level to an altered level;
detecting a type of the wireless apparatus based on comparing the time period to a set of stored time periods, each time period indicating a specific type of the wireless apparatus, wherein the time period is affected by a specific capacitance caused by one or more capacitors of the wireless apparatus into the electric connector; and
customizing the payload data to be transmitted based on the detected type of the wireless apparatus.

9. The system of claim 1,
wherein the power source comprises:
a timer configured to wake up the processor continuously after a predetermined time period has passed in order to perform the described processing.

10. The system of claim 1,
wherein the wireless apparatus is caused to perform the following:
obtaining control data to be transmitted;
encoding the control data using a predefined current modulation protocol;
controlling the wireless apparatus to alter a consumption of the electric power obtained from the electric connector; and
controlling the wireless apparatus to modulate the current level of the electric connector in order to transmit the encoded control data to the power source; and wherein the power source is caused to perform the following:
after detecting that the current level of the electric connector is altered, starting to sample the current of the electric connector in order to receive the encoded control data, and decode the encoded control data.

11. The system of claim 10, wherein the wireless apparatus is configured to operate using two or more current levels, and the predefined current modulation protocol is configured to encode the control data using the two or more current levels.

12. The system of claim 10, wherein the control data comprises control information related to the predefined voltage modulation protocol.

13. The system of claim 11, wherein the control information comprises an acknowledgement or a negative-acknowledgement.

14. The system of claim 10, wherein the control data comprises new software for the power source,
   and wherein the power source is caused to perform the following:
      overwriting the new software into the one or memories of the power source.

15. A method for transmitting payload data in an electric power supply connector between a power source and a wireless apparatus, the method comprising:
   obtaining, by the power source, payload data to be transmitted;
   encoding, by the power source, the payload data using a predefined voltage modulation method;
   altering, by the power source, a voltage level of the electric connector in order to trigger the wireless apparatus to sample the voltage of the electric connector;
   modulating, by the power source, the voltage level of the electric connector in order to transmit the encoded payload data to the wireless apparatus; and
   after detecting, by the wireless apparatus, that the voltage level of the electric connector is altered, starting, by the wireless apparatus, to sample the voltage of the electric connector in order to receive the encoded payload data, and decode the encoded payload data.

* * * * *